United States Patent [19]

Watanabe et al.

[11] 4,363,499
[45] Dec. 14, 1982

[54] TILTABLE STEERING MECHANISM FOR AUTOMOBILES

[75] Inventors: Kenichi Watanabe; Kazuo Katayama; Takao Kijima, all of Hiroshima, Japan

[73] Assignee: Toyo Kogyo Co., Ltd., Hiroshima, Japan

[21] Appl. No.: 120,982

[22] Filed: Feb. 13, 1980

[30] Foreign Application Priority Data

Feb. 14, 1979 [JP] Japan .............................. 54-18156[U]

[51] Int. Cl.³ .............................................. B62D 1/18
[52] U.S. Cl. ........................................ 280/775; 74/493
[58] Field of Search ............... 280/775, 779, 780, 750; 74/492, 493

[56] References Cited
U.S. PATENT DOCUMENTS 2,549,925  4/1951  Paton .................................. 280/775
3,580,101  5/1971  Jorgensen ........................... 280/775
3,597,993  8/1971  Ripley ................................... 74/492
3,923,319  12/1975 Nonaka ................................ 280/750
4,022,495  5/1977  Pizzocri .............................. 280/750
4,179,137  12/1979 Burke ................................... 280/779
4,297,911  11/1981 Grahn et al. ......................... 74/492

Primary Examiner—Robert R. Song
Attorney, Agent, or Firm—Fleit & Jacobson

[57] ABSTRACT

A tiltable steering mechanism having a steering shaft connected at lower end through a universal joint with one end of an intermediate shaft which is in turn connected at the other end through a universal joint with a steering gear mechanism. The steering shaft is supported by the automobile body through an adjusting device. The intermediate shaft is of a unitary construction and journalled by a bearing on the body so that the steering shaft is tiltably moved about the universal joint at the lower end thereof through an actuation of the adjusting device.

7 Claims, 3 Drawing Figures

TILTABLE STEERING MECHANISM FOR AUTOMOBILES

The present invention relates to tiltable steering mechanisms for automobiles and more particularly to steering shaft journalling means for tiltable steering mechanisms.

Conventionally, a tiltable steering mechanism for automobiles includes a steering shaft having one end provided with a steering wheel and the other end connected through a universal joint with an intermediate shaft which is in turn connected through a universal joint with a steering gear mechanism. The steering shaft is generally housed or journalled in a steering column which is supported on an automobile body by an upper and lower supporting devices. The lower supporting device is designed to provide a fulcrum of the tilting movement and the upper supporting device provides adjusting means. Since the steering shaft is thus supported for tilting movement about the fulcrum provided by the lower supporting device, the lower end of the steering shaft is displaced upon adjustment of the tilting angle of the steering shaft. In order to accommodate for such displacement of the lower end of the steering shaft, the intermediate shaft is comprised of two sections which are splined together so that its overall length can be adjusted as desired. It will thus be understood that the conventional tiltable steering mechanism is very complicated in structure and requires a large number of parts. Thus, the overall manufacturing cost is also increased.

It is therefore an object of the present invention to provide a tiltable steering mechanism for automobiles which has a simple structure and requires only a small number of parts.

Another object of the present invention is to provide a tiltable steering mechanism in which the intermediate shaft can be of a unitary construction.

According to the present invention, the above and other objects can be accomplished by a tiltable steering mechanism comprising a steering shaft mounted on a stationary part of an automobile through adjusting means which provides adjustments at least in vertical directions, an intermediate shaft journalled on a stationary part of the automobile and having one end connected through a first universal joint with an end of the steering shaft and the other end through a second universal joint with a steering gear mechanism so that the steering shaft is tiltably moved about the first universal joint upon adjustment of the adjusting means. In a preferable mode of the present invention, the intermediate shaft is journalled by means of a bearing assembly which is supported by a rubber bushing. The adjusting means may be comprised of an adjusting bolt which is passed through a bracket on the stationary part of the automobile and a bracket on the steering shaft and engaged with a nut which is in the form of an adjusting lever.

In order that the invention be more clearly understood, descriptions will now be made of a preferable embodiment taking reference to the accompanying drawings, in which.

Figure 1:
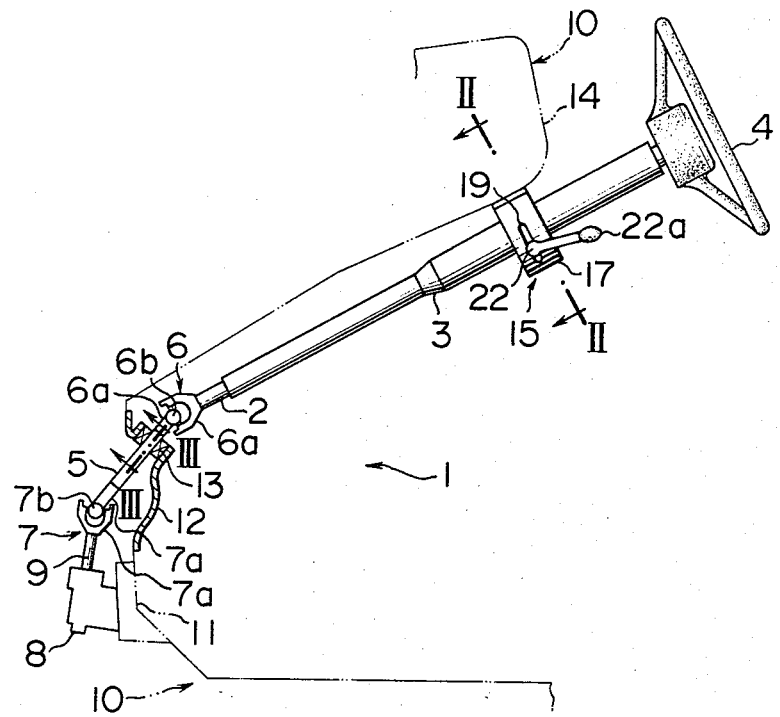
FIG. 1 is a side view of the tiltable steering mechanism in accordance with one embodiment of the present invention.

Referring now to the drawings, particularly to FIG. 1, there is shown a tiltable steering mechanism 1 which includes a steering shaft 2 rotatably journalled in a steering column 3. On the upper end of the steering shaft 2, there is provided a steering wheel 4. The steering shaft 2 is connected at the lower end with the upper end of an intermediate shaft 5 through a universal joint 6. The lower end of the intermediate shaft 5 is connected through a universal joint 7 with a shaft 9 of a steering gear box 8.

Figure 3:
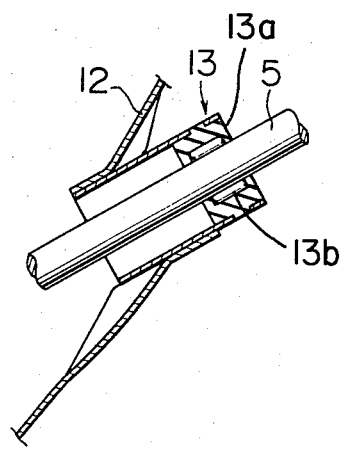
FIG. 3 is a sectional view taken substantially along the line III—III in FIG. 1.

The intermediate shaft 5 is of a unitary construction and rotatably supported through a bearing assembly 13 on a bracket 12 which is provided on a lower dash panel 11 of an automobile body 10. As shown in FIG. 3, the bearing assembly 13 comprises a rubber bush 13a and a bearing 13b disposed in the rubber bush 13a. The universal joints 6 and 7 are respectively comprised of bifurcated yokes 6a and 7a and cross fittings 6b and 7b as in conventional universal joints.

Figure 2:
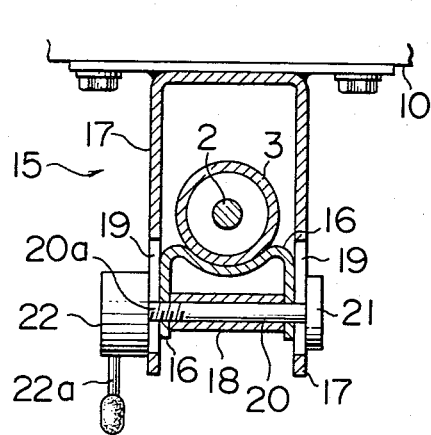
FIG. 2 is a sectional view taken substantially along the line II—II in FIG. 1.

The steering column 3 is mounted on the lower portion of an instrument panel 14 by means of an adjustable mounting device 15 which is designed for adjustment of the position of the steering column 3 in vertical directions. As shown in detail in FIG. 2, the steering column 3 has a column bracket 16 which is secured thereto and of a substantially U-shaped configuration to be fitted to a stationary bracket 17 provided on the instrument panel 14. The bracket 17 is of a substantially U-shaped configuration and the bracket 16 is fitted between the legs of the U-shape. Between the legs of the U-shape of the bracket 16, there is provided a spacer sleeve 18 having an axial hole. The stationary bracket 17 is formed at its legs with aligned slots 19 and a bolt 20 is inserted through the sleeve 18 and the slots 19. The bolt 20 has a head 21 at one end and a threaded portion 20a at the other end. A tightening nut 22 having an actuating lever 22a is engaged with the threaded portion 20a of the bolt 20.

It should therefore be understood that when the vertical position of the steering wheel 4 is to be adjusted, the lever 22a is at first actuated to loosen the nut 22 and the tilting angle of the steering shaft 2 is adjusted by moving it about the cross fitting 6b of the universal joint 6 between the lower end of the steering shaft 2 and the intermediate shaft 5. After the steering shaft 2 is moved to a desired tilting angle, the lever 22a is again actuated to tighten the nut 22.

From the above description, it will be noted that a tiltable steering mechanism can be provided with a minimum number of parts. The structure is very simple and light in weight as compared with conventional arrangements. Although the invention has thus been shown and described with reference to a specific embodiment, it will be noted that the invention is in no way limited to the details of the illustrated structures but changes and modifications may be made without departing from the scope of the appended claims.

We claim:

1. A tiltable steering mechanism comprising a steering shaft, a steering column rotatably supporting said steering shaft and mounted on an instrument panel of an automobile at a lower portion thereof through adjusting means which provides adjustments at least in vertical directions, an intermediate shaft transversely immovably journalled on a stationary part of the automobile through bearing means and having one end connected through a first universal joint with an end of the steering shaft and the other end through a second universal joint with a steering gear mechanism so that the steering shaft is tiltably movable about the first universal joint upon adjustment of the adjusting means without corresponding movement of said intermediate shaft.

2. A tiltable steering mechanism in accordance with claim 1 in which said adjusting means includes an adjusting bolt which is passed through a bracket on the instrument panel of the automobile and a bracket on the steering column and engaged with a nut which is in the form of an adjusting lever, one of said brackets being formed with slot means for passing the bolt therethrough.

3. A tiltable steering mechanism in accordance with claim 1 in which said bearing means includes rubber bushing means.

4. A tiltable steering mechanism in accordance with claim 2 in which said brackets are of U-shaped cross-sectional configuration and the bracket on the steering column is fitted to the bracket on the instrument panel of the automobile, the slot means being formed in legs of the latter mentioned bracket.

5. A tiltable steering mechanism comprising:
a steering shaft;
a steering column rotatably supporting said steering shaft;
means for adjustably mounting the steering column on a lower portion of an instrument panel of a vehicle so that the position of an upper end of the steering shaft is vertically adjustable;
an intermediate shaft;
means for rotatably and transversely immovably supporting said intermediate shaft on a lower dash panel of a vehicle;
a first universal joint for connecting a first end of said intermediate shaft with a lower end of said steering shaft; and
a second universal joint for connecting a second end of said intermediate shaft with a steering gear mechanism so that the steering shaft is tiltably movable about the first universal joint upon adjustment of the position of the upper end of the steering shaft without transversely moving said intermediate shaft.

6. A tiltable steering mechanism in accordance with claim 5 in which said means for adjustably mounting comprises:
an at least partially threaded adjusting bolt;
a first bracket connected to the instrument panel;
a second bracket connected to the steering column, one of said brackets having aligned slots formed therein and the other bracket having bores formed therein alignable with portions of the slots for receiving therethrough said adjusting bolt; and
a tightening nut engageable with a threaded portion of said bolt to releasably hold said brackets in a desired relationship to thereby fix the position of the steering column and hold the upper end of the steering shaft in a desired position.

7. A tiltable steering mechanism comprising a steering shaft having a steering wheel attached to one end thereof, an intermediate shaft connected at one end with the other end of the steering shaft through a first universal joint, a steering gear mechanism mounted on a stationary part of an automobile and connected with the other end of the intermediate shaft through a second universal joint, said intermediate shaft being supported between said first and second universal joints by a dash panel of the automobile for rotation about a longitudinal axis of the intermediate shaft and against movement perpendicularly to said longitudinal axis of the intermediate shaft, a steering column supporting said steering shaft for rotation about a longitudinal axis thereof, said steering column being mounted at a portion thereof on a stationary part of the automobile through adjustable means so that said steering column can be adjusted vertically with respect to the stationary part to thereby adjust a tilt angle of the steering shaft about the first universal joint, said adjustable means supporting said steering column so that said steering shaft is rotatable about said first universal joint without corresponding movement of said intermediate shaft.

* * * * *